United States Patent
Johnson et al.

(10) Patent No.: US 8,333,129 B2
(45) Date of Patent: Dec. 18, 2012

(54) ROBOTIC MANIPULATOR ARM

(75) Inventors: Sam Johnson, Loveland, CO (US);
Taylor Drew Ritchie, Fort Collins, CO (US); Gerald Vincent Castillo, Jr., Fort Collins, CO (US); Eric D. Schroder, Loveland, CO (US); Eric James Versluys, Louisville, CO (US)

(73) Assignee: S.A. Robotics, Loveland, CO (US)

( * ) Notice: Subject to any disclaimer, the term of this patent is extended or adjusted under 35 U.S.C. 154(b) by 1044 days.

(21) Appl. No.: 12/260,895

(22) Filed: Oct. 29, 2008

(65) Prior Publication Data

US 2010/0101346 A1 Apr. 29, 2010

(51) Int. Cl.
*B25J 17/00* (2006.01)
(52) U.S. Cl. .................................................. 74/490.05
(58) Field of Classification Search ............... 74/490.01, 74/490.02, 490.03, 490.04, 490.05; 901/9, 901/23, 24, 25, 28, 29, 46
See application file for complete search history.

(56) References Cited

U.S. PATENT DOCUMENTS

| | | | | |
|---|---|---|---|---|
| 4,606,695 A | * | 8/1986 | Lenz | 414/735 |
| 5,040,427 A | * | 8/1991 | Tanita et al. | 476/3 |
| 5,155,423 A | * | 10/1992 | Karlen et al. | 318/568.11 |
| 2001/0045807 A1 | | 11/2001 | McConnell et al. | |
| 2002/0007997 A1 | | 1/2002 | Kundermann et al. | |
| 2005/0053909 A1 | * | 3/2005 | Chan | 434/365 |

FOREIGN PATENT DOCUMENTS

JP 02271140 A * 11/1990

OTHER PUBLICATIONS

International Search Report, PCT/US09/062040, Dec. 9, 2009 (3 pages).

* cited by examiner

*Primary Examiner* — Vicky Johnson
(74) *Attorney, Agent, or Firm* — Hart IP Law and Strategies, LLC

(57) ABSTRACT

In one embodiment, a robotic manipulator arm includes a robotic joint, a rotational position sensor, and a control system. The rotational position sensor is coupled to the main housing of the robotic joint. The control system is connected to the rotational position sensor. During normal rotational motion toward a commanded motor position of joint output, the control system determines that normal joint un-slipped motion is occurring with respect to the joint output in response to the motor input commands. Responsive to joint slip during commanded motor motion, the control system compares position data from the rotational position sensor to commanded motor position to generate an error value and, based on the error value, compensates for the joint slip.

23 Claims, 10 Drawing Sheets

ROBOTIC MANIPULATOR ARM

BACKGROUND

The field of robotics involves the use of machines to manipulate the environment, especially in the case of machines that perform human-like manipulation. Robotic machinery, including robotic appendages, can operate in a variety of environments, including those that may be inhospitable to humans or have a high degree of danger to humans. At times, robotic machinery may be exposed to forces that may damage the robotic machines or appendages, or otherwise interfere with the proper operations of the robot to complete the mission or task it was instructed or programmed to perform.

BRIEF SUMMARY

In one embodiment, a robotic manipulator arm includes a robotic joint, a rotational position sensor, and a control system. The rotational position sensor is coupled to the main housing of the robotic joint. The control system is connected to the rotational position sensor. During normal rotational motion towards a commanded motor position of joint output, the control system determines that normal joint un-slipped motion is occurring with respect to the joint output in response to the motor input commands. Responsive to joint slip during commanded motor motion, the control system compares position data from the rotational position sensor to commanded motor position to generate an error value and, based on the error value, compensates for the joint slip.

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

DETAILED DESCRIPTION

Overview

Figure 1:
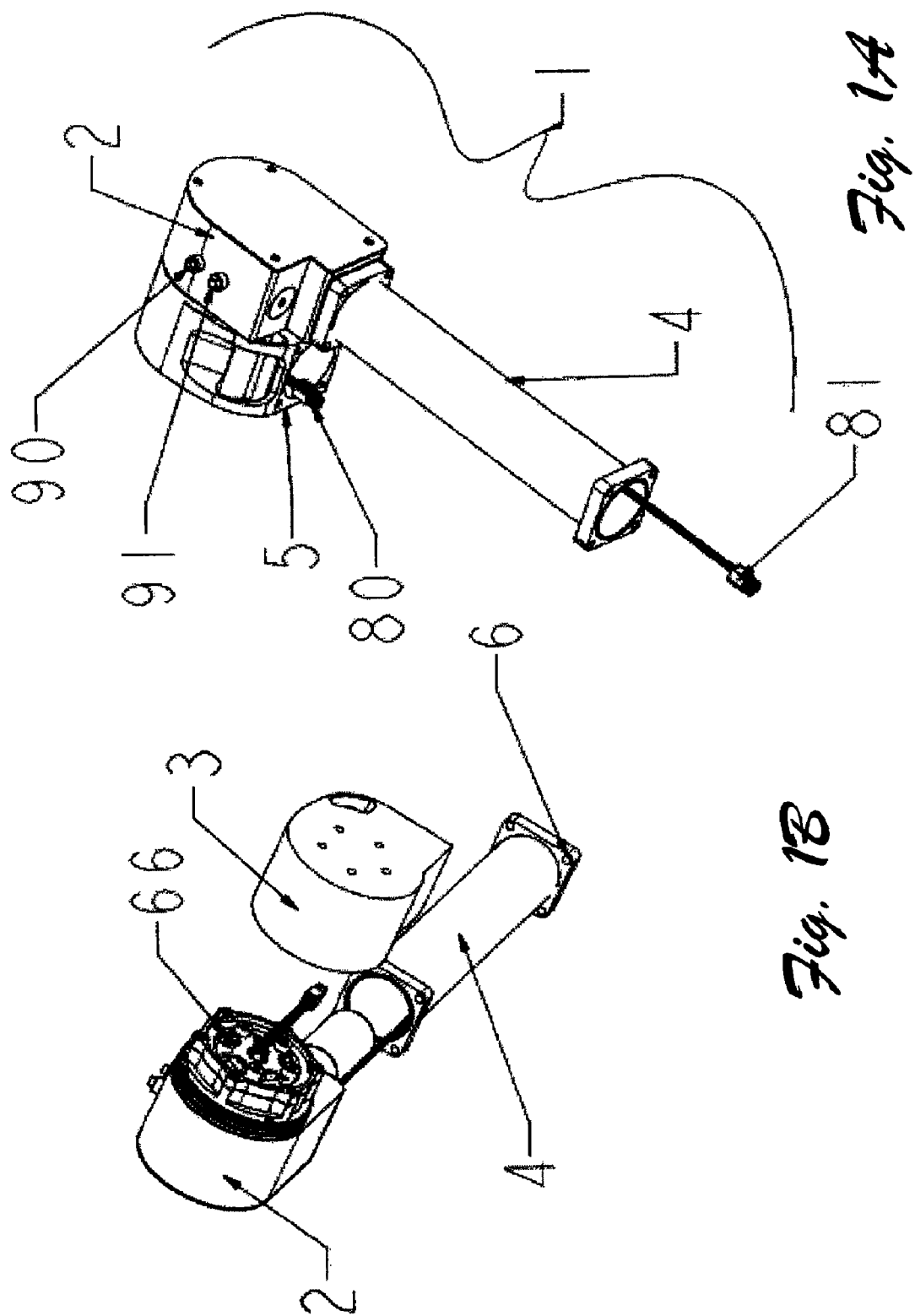
FIG. 1A shows a perspective view of a robotic manipulator arm comprising a robotic joint and a position tube, according to one embodiment.
FIG. 1B shows a perspective view of the robotic joint of FIG. 1A with a joint housing removed, according to one embodiment.

During operation, robotic machinery may be exposed to forces that may damage the robotic machines or appendages, or otherwise interfere with the proper operation of the robot to complete a particular set of tasks in an optimal manner. The following described systems and methods for a robotic manipulator arm address these and other limitations of conventional robotic systems by providing mechanisms and operations to dissipate and compensate for such forces to complete a particular set of originally assigned tasks. More specifically, the systems and methods for a robotic manipulator arm, in response to detecting slippage in a robotic joint (e.g., due to outside interference such as a force to a robotic appendage) will attempt to dissipate any force that may have caused the slippage, and reposition the robotic joint to compensate for any variance in the position of the joint due to the outside interference. For example, in one embodiment, a robotic joint includes a clutch mechanism to dissipate forces and a rotational position sensor in communication with a control system to identify joint slippage and correct for detected joint slippage. These and other aspects of the systems and methods for a robotic manipulator arms are now described in greater detail.

An Exemplary Robotic Manipulator Arm

FIG. 1A shows a perspective view of a robotic manipulator arm comprising a robotic joint and a position tube, according to one embodiment. FIG. 1B is an exemplary perspective view of the robotic joint of FIG. 1A, according to one embodiment, with the joint housing removed. A modular joint forming can be assembled in a variety of ways, with a single joint to provide rotate, roll, pitch, and yaw functions. Referring to FIGS. 1A and 1B, there is shown an exterior of the modular joint 1 illustrating several exemplary elements of a modular joint. For example, rotary module 2 provides for gearing, torque multiplication, clutching, position feedback, and electronic control module functions for a self-contained rotary joint. Rotary module 2 is capable of continuous rotation. Joint output cover 3 provides protection for rotary module 2. Interconnect structural tubular member 4 is modular and can be of varying lengths to accommodate different functions. Compatible attachment points 5 are complimentary to bolt-up holes 6 and provide a convenient means of modular attachment. In this implementation, interconnect structural tubular member 4 is configured to encapsulate/enclose cylindrical primary drive motor 7 (please see FIG. 3), which is also a member of basic rotary module 2. Joint output cover 3 bolts up to a slow speed final output stage of basic rotary module 2 and has compatible attachment points 5 therein to attach to yet additional modular joints 1. Thus, multiples of modular joint 1 can be assembled in a variety of useful and compact configurations. This allows for a variety of modular arrangements; tubular members may be connected to joints any number of times and in any number of configurations desired. Also shown are buttons 90 and 91 (an exemplary user interface) which allow for the robotic joint to be released and repositioned manually.

Figure 2:
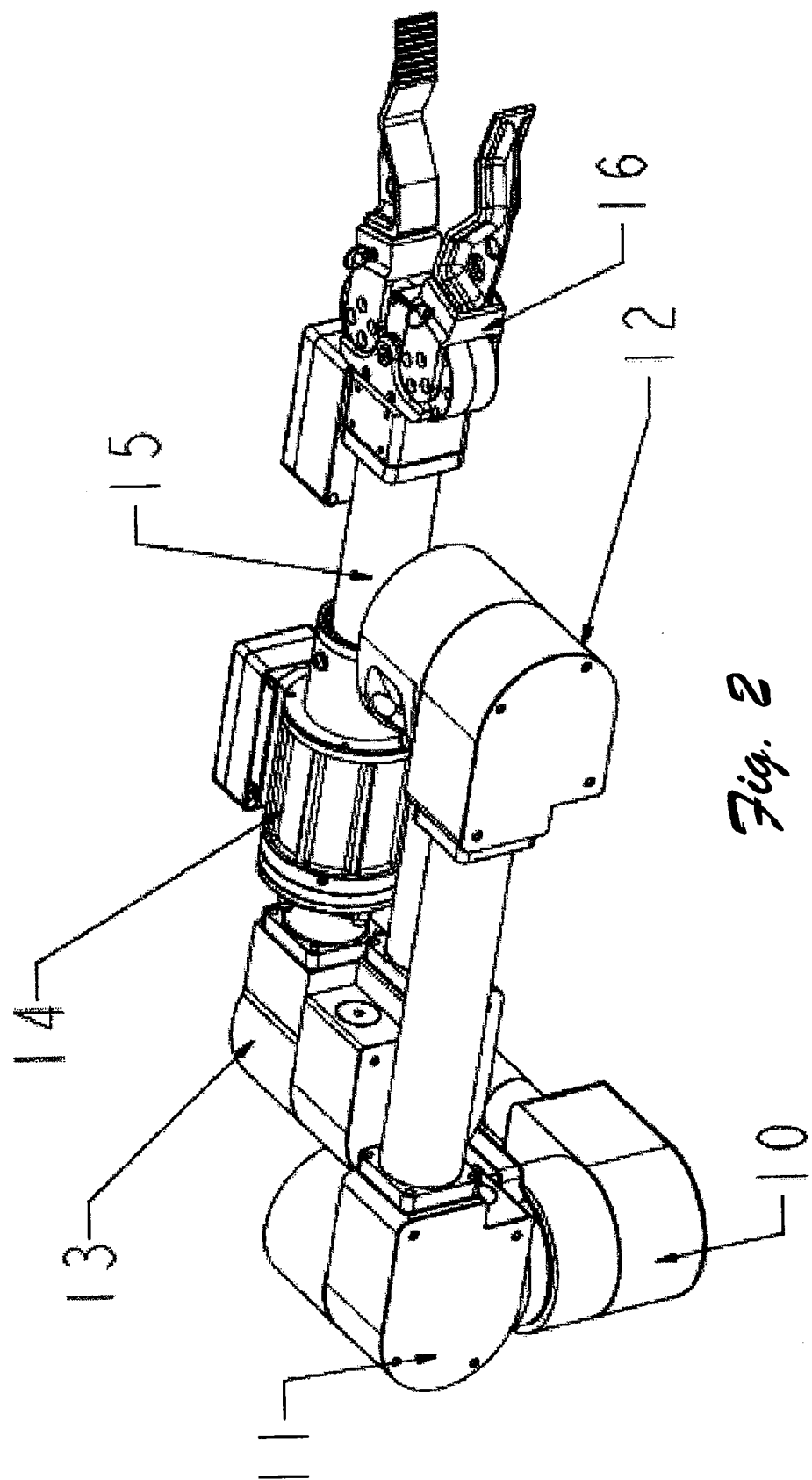
FIG. 2 illustrates a perspective view of a robotic manipulator arm, according to one embodiment.

FIG. 2 shows a perspective view of one exemplary embodiment of a robotic arm. In FIG. 2, joints 10, 11, 12, and 13 are similarly constructed elements of the modular joint 1 shown earlier in FIGS. 1A and 1B. The robotic arm of FIG. 2 has joints 10, 11, 12, and 13 configured to provide base rotate, shoulder pitch, elbow pitch, and wrist pitch functions. Additional joint degrees of freedom mounted after joint 13 are wrist rotate 14, wrist extend 15, and gripper 16. This arm is one example of a robotic arm that may be created with the modular joints described herein. With the exception of gripper joint 16, all joints depicted can be interchangeably moved and repositioned for new and different functionality. In the exemplary configuration depicted in FIG. 2, the robotic manipulator is in a highly stowed position collapsed to a folded height of less than 5" high. This represents a compact configuration for mounting onto mobile portable tracked and wheeled robotic platforms such as might be used, for example, for explosive ordinance disposal, under vehicle inspections, hazardous material handling, etc.

By means of an example, for the 7 degrees of freedom manipulator arm depicted in FIG. 2, the performance of the constructed prototype can pick up and manipulate a 30-pound object at a full extended reach of 68 inches from the base rotate (joint 10) mounting centerline, and pick up and manipulate objects weighing over 100 pounds at a distance of 28 inches from the base rotate (joint 10) mounting centerline. In this exemplary implementation, each modular joint 10, 11, 12, and 13 was characterized to provide in excess of 3000 in-lbs. of torque at a rated speed of 10 degrees per second.

Figure 3:
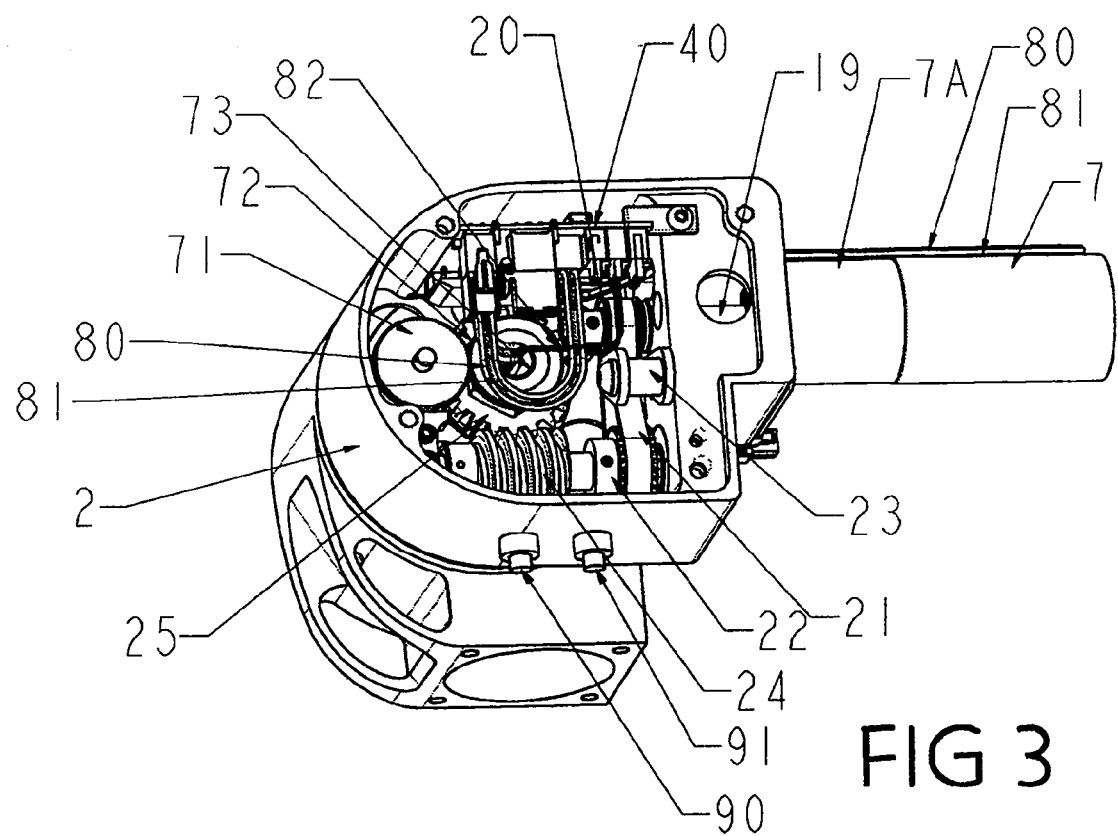
FIG. 3 shows a cutaway perspective view of the robotic joint of FIG. 1A, according to one embodiment.

FIG. 3 shows a cutaway perspective view of the exemplary robotic joint of FIG. 1A with the access cover plate removed. FIGS. 3-6 are interrelated, and many of the parts described are also found in multiple figures. Power is transmitted through the joint beginning at drive motor 7. In one implementation, drive motor 7 is an electric motor of DC brushed, DC brushless, or AC synchronous types. In one implementation, integrally fitted to electric drive motor 7 is an integral gear head 7A, which contains either spur or planetary type gearing to affect a first stage of gearing from 2:1 to in excess of 200:1. In one embodiment, for the performance specification presented in the paragraph above, a 200 watt brushless DC motor having an integrated 14:1 gear head comprised the elements of motor 7 and gear head 7a. Shaft coupler 19 attaches the output shaft from gear head 7A to timing belt pulley 20 in a direct manner. Miniature timing belt 21 transfers power from timing pulley 20 to worm drive timing pulley 22. Tensioner 23 provides an optimal timing belt tension for the delivery of substantially maximum power without damage to timing teeth present on timing belt 21. Worm gear 25, which interfaces with worm 24, is directly driven by timing pulley 22, and is supported between a pair of shaft mounted bearings internal to main housing member 26 (please see FIG. 5). Motor 7 and gear head 7A are fixedly attached to machined main housing member 26. Bearings internal to main housing member 26 provide translational and positional rigidity to timing belt pulley 20. Worm 24 and worm gear 25 allow for load holding capability of the joint upon removal of power. This single lead worm and worm gear combination has a self-holding ability for all coefficients of tooth sliding friction, but the efficiency is below 30 percent at high tooth loading and relatively slow sliding teeth velocities. Dual pitch worm and worm gear combinations are available with higher power transfer efficiencies, however, for a given pitch diameter and effective gearing ratio, their tooth strengths are substantially lower. Also, for low coefficients of friction, worm/worm gear combinations are less likely to load hold in the absence of an electric drive. In the exemplary embodiment shown in the FIGS. 3-6, worm 24 and worm gear 25 may be of single lead, 20:1 gearing ratio construction.

Figure 4:
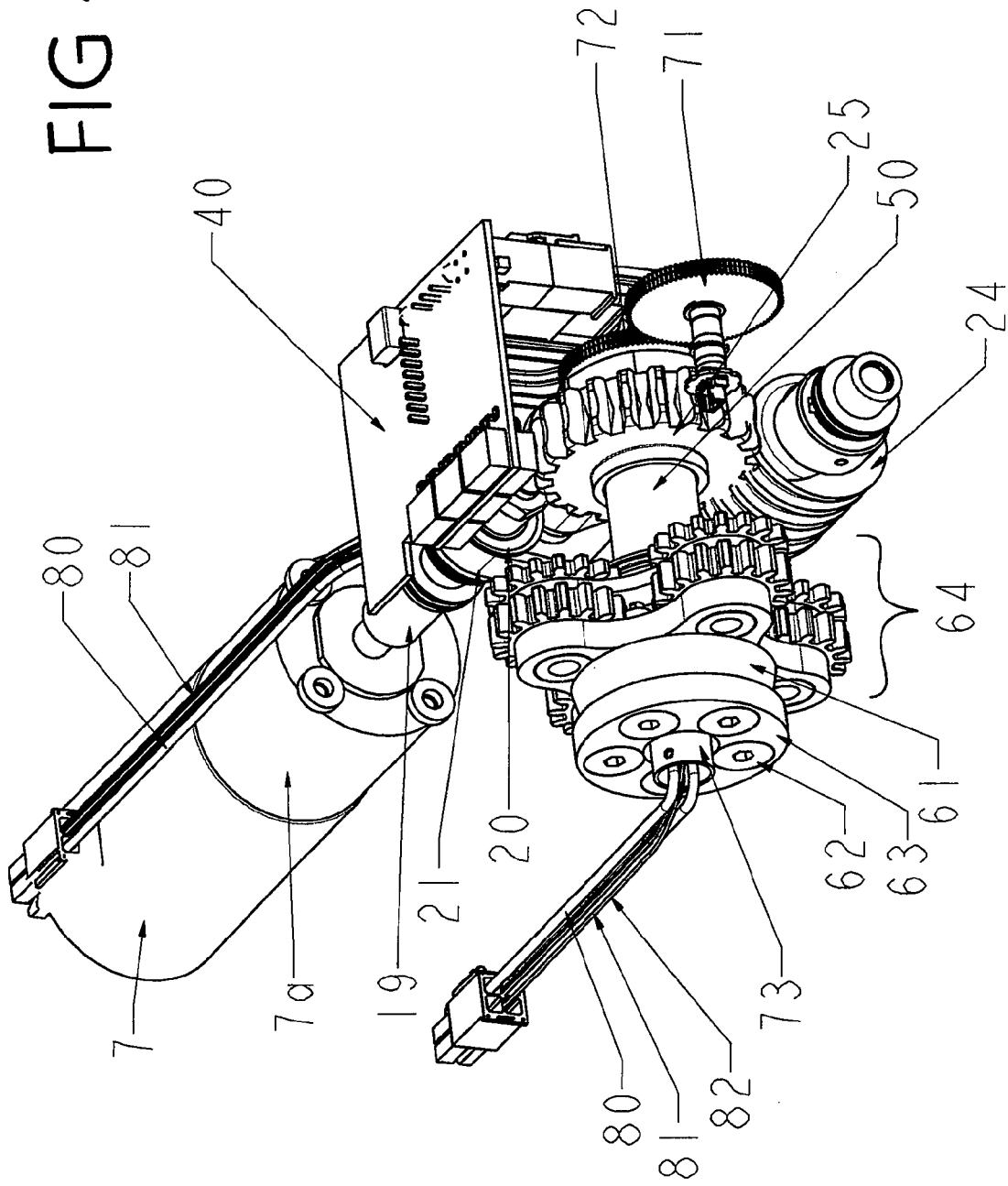
FIG. 4 illustrates a perspective view of the robotic joint of FIG. 1A with the joint housing removed, according to one embodiment.

Referring to FIG. 4, there is illustrated an exemplary perspective view of the robotic joint of FIG. 1A, according to one embodiment. As shown in FIG. 4, the joint housing is removed, hollow stub shaft 50 is attached to worm gear 25, and has broached onto the first stage planetary sun gear 51 of FIG. 6. Bearings 52 of FIG. 6, and 27 of FIG. 6, precisely position and constrain hollow stub shaft 50 into the main housing member 26, as shown in the cross-sectional cutaway of FIG. 5.

Figure 6:
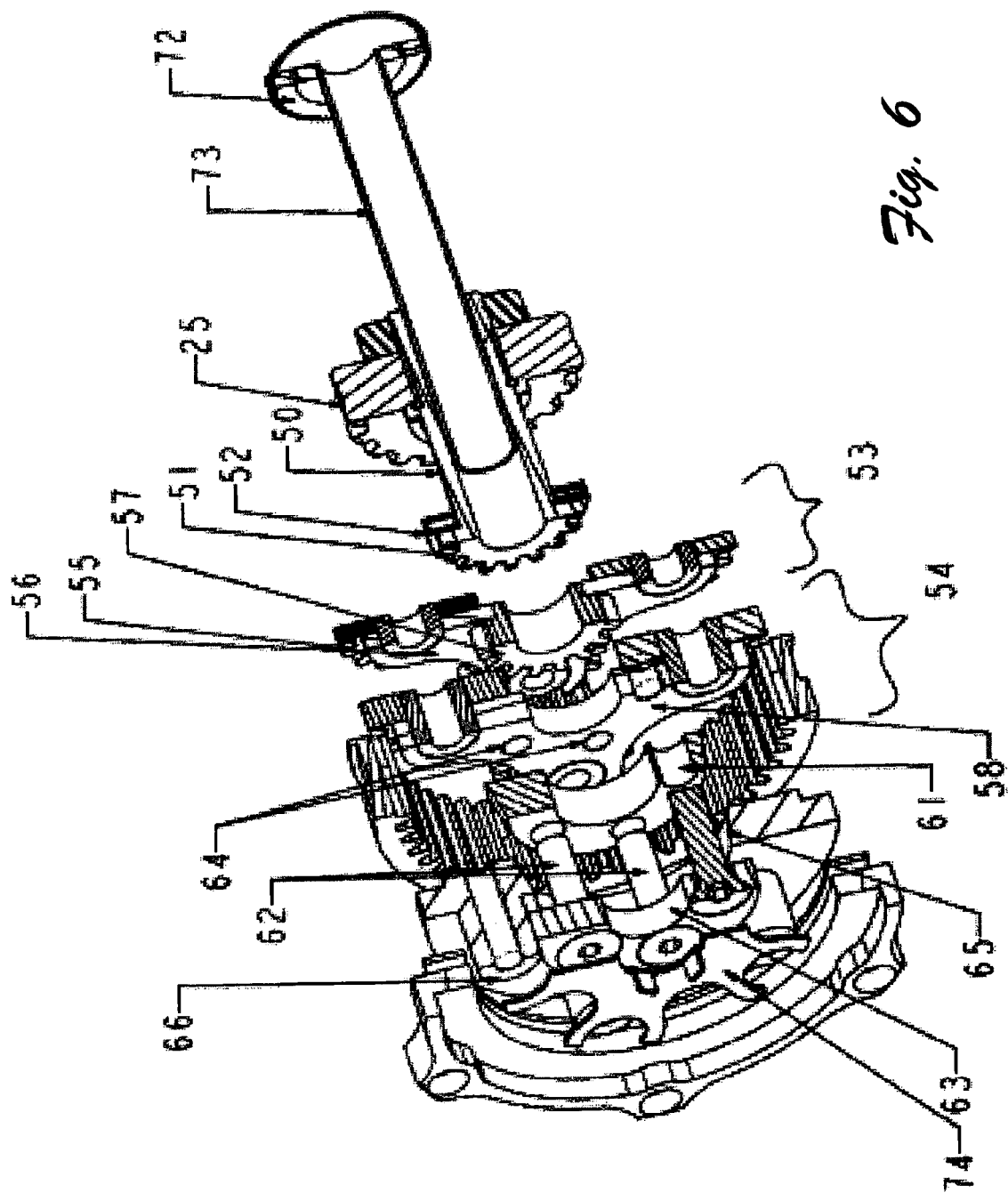
FIG. 6 is a detailed view of the gear set and clutch of the robotic manipulator arm of FIG. 1A, according to one embodiment.

Referring to FIG. 6, which is a detailed view of the gear set and clutch of the robotic joint of FIG. 1A, first stage planetary gearing module 53 provides a first stage planetary gear reduction thru planet gears 55, fixed ring gear 60, and rotating planet carrier 56, with the developed increased torque of planet carrier 56 coupled into the second stage planetary gearing module 54 by output planetary sun gear 57. Second stage planetary gearing module 54 likewise torque multiplies the power delivered by first stage planet output sun gear 57 by gear reduction through second stage planetary output carrier 58, fixed ring gear 60, and second stage planetary output carrier 58, with the developed increased torque of second stage planetary output carrier 58 coupled directly to the tapered clutch cone disk 61. Multiple through clamping bolts 62 pass through clutch preload disk 63 and tapered clutch cone disk 61, and thread into matching threaded holes 64 within second stage planetary output carrier 58. The above planetary and clutch elements are presented in unexploded form in FIG. 4, where it is shown that clamping bolts 62 pass through clutch preload disk 63 and tapered clutch cone disk 61, and thread into matching threaded holes 64 tapped into second stage planetary output carrier 58. These elements comprise the clutch cone clamping assembly, represented as assembly 54 (FIG. 6). Clamped between clutch preload disk 63 and clutch cone disk 61 is a tapered output hub disk 65 of FIG. 6. It can be seen that the taper angle of clutch cone disk 61 can be sufficiently matched to the machined taper found in output hub disk 65.

In one exemplary embodiment, and to substantially ensure clutch repeatability, longevity, and precision of setting the clutching torque, at least one of the clutch cone disk 61 or output hub disk 65 may be manufactured of a substantially harder material than the other. In one alternative, clutch cone disk 61 is ground and hardened of tool steel to Rockwell hardness from 40 to 60 on the C scale. Likewise, second stage planetary output carrier 58 may also be hardened to insure threaded holes 64 have adequate strength to allow the full proof strength of clamping bolts 62 to be developed. It can be seen from FIG. 6 that clutch preload disk 63 applies sufficient clamping force directly to tapered output hub disk 65 to force the tapers of output hub disk 65 and driven clutch cone disk 61 together under high pressure. An expression that relates the required clamping force, Fc, provided by clamping bolts 62 is as follows:

$$Fc = [3*((D1/2)^2 - (D2/2)^2) * \sin(\phi) * Tj] / [[2 * \mu * (D1/2)^3 - (D2/2)^3]] \quad \text{Equation 1:}$$

where D1 is the taper engaged outer diameter, D2 is the taper engaged inner diameter, $\phi$ is the taper angle, Tj is the required holding torque, and $\mu$ is the coefficient of friction between the clutch mating surfaces. In one exemplary embodiment, D1=2 in, D2=1.89 in, $\phi$=12 degrees, $\mu$=0.12, and Tj=6600 in-lb torque. The clamping force Fc to be provided by clamping bolts 62, therefore, is 13171 pound force (lbf).

Operation of the clutch principle is to exploit the self energizing nature of conical clutch surfaces output hub disk 65 and clutch cone disk 61, as shown in the exploded view of FIG. 6. Clamping bolts 62 (which may be high strength) apply clamping forces to clutch preload disc 63, which in turn applies a pressure to tapered output hub disk 65, which develops hoop stresses in the immediate area of the mating taper to clutch cone disk 61, in order to transfer the requited torque calculated in equation 1. As long as the material properties of output hub disk 65 and clutch cone disk 61 do not exceed mechanical yield, and are properly lubricated with an extreme pressure grease or dry type lubricant, the clutch release torque will be consistent within better than 5% of the required clutch holding torque over hundreds and thousands of over-torque slip cycles.

Figure 5:
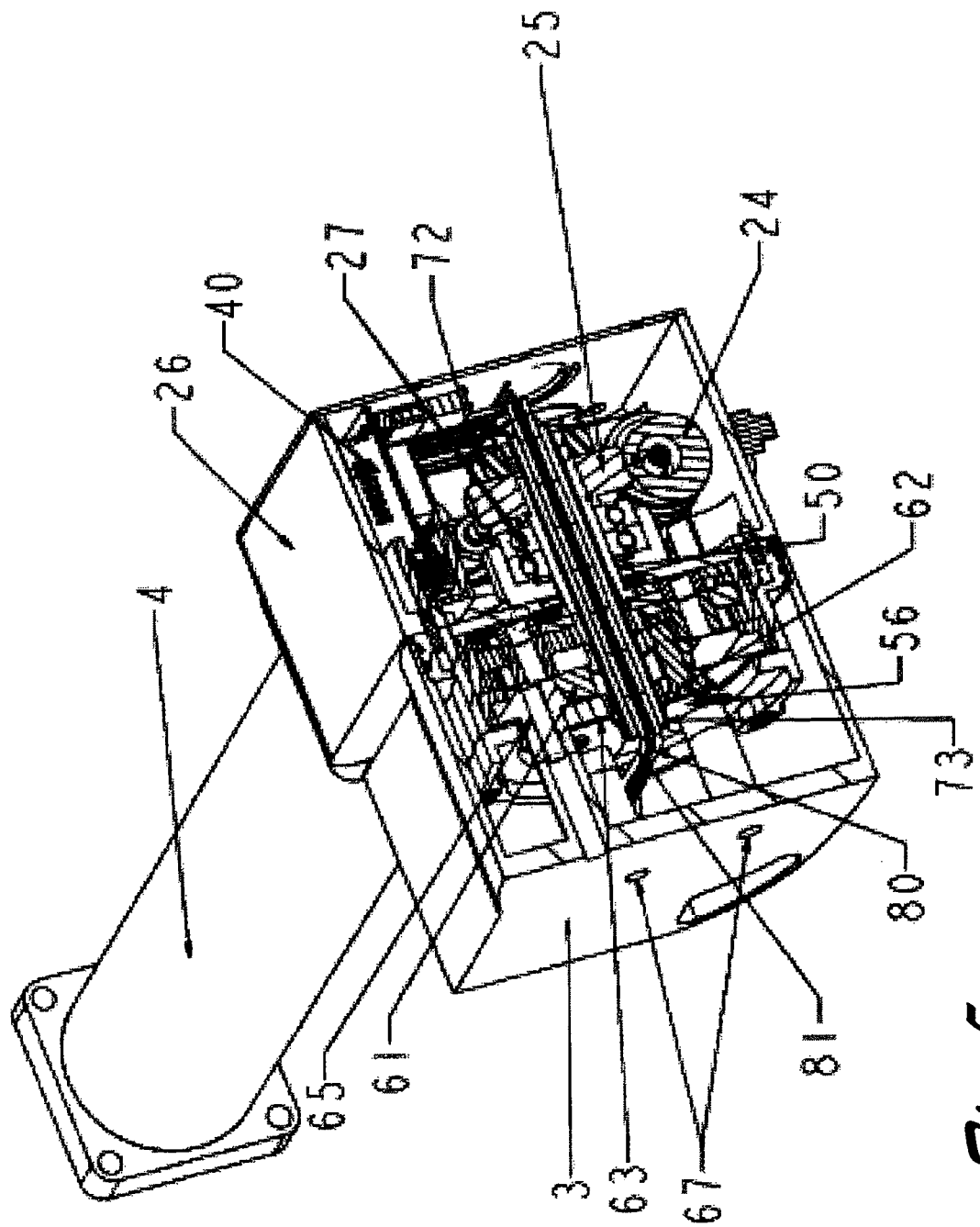
FIG. 5 is a cutaway perspective view of the robotic joint and position tube of FIG. 1A, according to one embodiment.

Referring to FIG. 5, which is a cutaway perspective view of the exemplary robotic joint and position tube of FIG. 1A, it can be seen that joint output cover 3 (FIG. 1A) in this example is directly attached to tapered output hub disk 65 by long bolts passing through attachment holes 66 (FIG. 1A) and 67 (FIG. 5). Referring to FIG. 1A, it is seen that another modular joint 1 can be attached to the preceding joint output cover 3 of FIG. 1B by means of bolts or the like passing through mounting holes in the surface of bolt-up flange 6 and into threaded holes or the like 5 in the preceding joint output cover 3. Thus, there is presented a means of producing complex, multi-degree-of-freedom manipulator assemblies with a simple bolt-up procedure of modular joints.

Referring to FIGS. 3, 5, and 6, we will now describe a method for sensing the position of joint output cover 3 to the controller 40 (or onboard control system), and a method of detection of joint slip in the event of an over-torque occurrence. Rotational position sensor 70 is mounted rigidly to main housing member 26, with the necessary interconnection wires to directly plug into controller 40 PCA. Other position sensors may be substituted for the rotational position sensor 70, including non-contacting types, including magnetic, optical, eddy-current, LVDT, etc. Light duty gears 71 and 72 or the like provide for offset coupling to coaxial transfer tube 73 (or position tube). Coaxial transfer tube 73 likewise passes through the hollow space provided by planetary gearing modules 53 and 54, to attach via press fit or the like to bracket 74, which is likewise directly driven by joint output cover 3. Thus, during normal rotational joint motion, with joint output cover 3 being rotationally driven, rotational position sensor 70 is directly driven; and, based on the motor input commands provided, controller 40 determines that normal joint un-slipped motion is occurring. In the event of a joint slip during a commanded motion, controller 40, by means of comparison of rotational position sensor 70 and commanded motor position, calculates an error resultant (e.g., error value 126 of FIG. 9). If the error value is not null, there was a joint slip. Based on this computed error resultant, controller 40 continues to apply appropriate motor commands (generated based on the error resultant) to continue to drive the joint output cover 3 until rotational position sensor 70 senses the desired/predetermined/target rotational position. In the event of a joint slip when no motor commands are being issued or active, such as might occur should some moving object crash into the stationary manipulator, controller 40 will likewise compare the desired joint output cover 3 position to the actual position and reposition the joint back to the original poise and desired positional location. This feature is automatic and independent of user intervention. This allows for reliance on a robotic mobile platform with a manipulator in a known and targeted position to perform a mission.

Referring to FIG. 6, it can be seen that a hollow passageway is formed through coaxial transfer tube 73 and planetary gearing modules 53 and 54 through which a cable wire bundle can easily pass. In one implementation, the length to diameter of coaxial transfer tube 73 is at least 4:1. With such a length-to-diameter ratio, a wire bundle contained within can easily twist as the joint rotates without overstress of the wire conductors or insulators. Such an implementation allows for ±360 degrees of joint rotation independent of using rotary slip rings, which can be prone to wear and contamination degradation. In one implementation, only 4 wires are bundled and passed through each joint. These are twisted pair 82, and power and ground 80 and 81 (e.g., please see FIGS. 1A and 4). In one implementation, additional wires, such as control signals, video coax, etc., are also bundled to pass through the hollow space within coaxial transfer tube 73 and planetary gearing modules 53 and 54.

Figure 7:
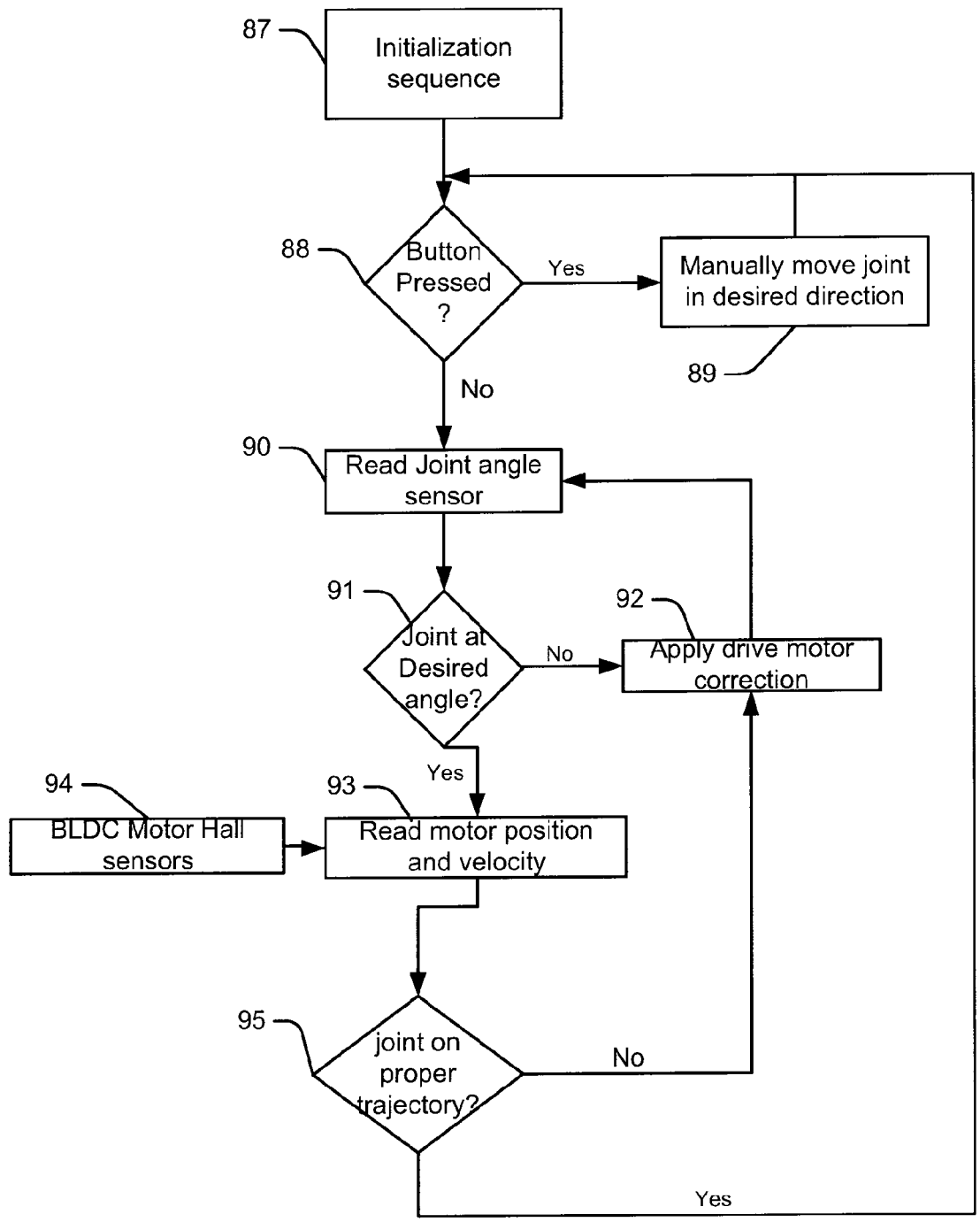
FIG. 7 is a block diagram of a control system for controlling a robot joint, according to one embodiment.
Figure 8:
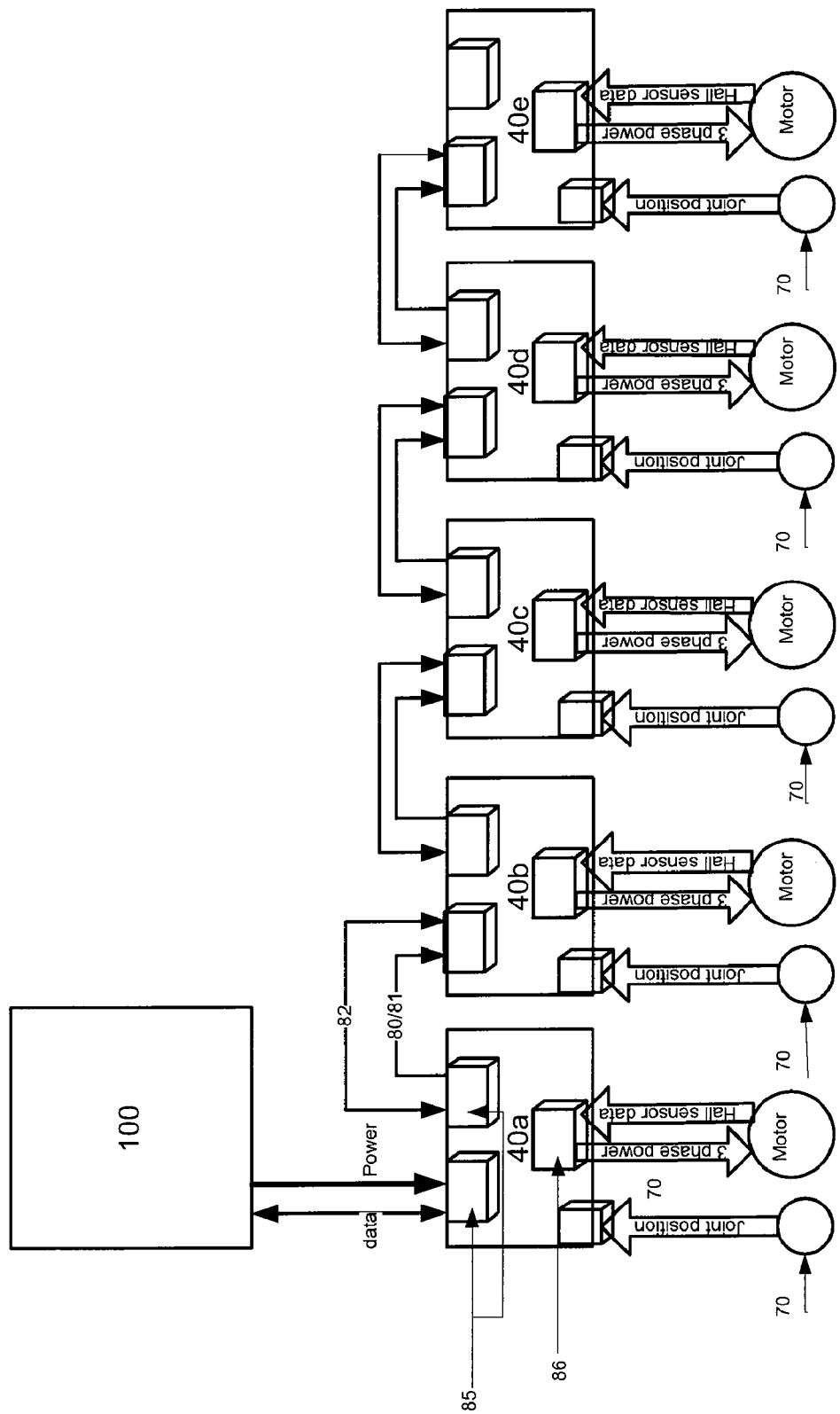
FIG. 8 is a block diagram of embedded motion controllers for controlling robotic joints, according to one embodiment.

Referring to FIGS. 7 and 8, there is a schematic block diagram and flow chart of an exemplary control system, according to one embodiment. Referring to FIG. 7, there is shown a flow chart showing exemplary operational sequences for a controller 40 of FIG. 5 to read both the motor and rotational sensor states and apply correction to compensate for detected joint slip. Additional capabilities of an exemplary embodiment include over- and under-voltage detection, error correction and detection of received data bits, current sensing, programmable motor current limiting, temperature sensing, PID motion control, and other data sensing and reporting capabilities. Referring to FIG. 7, operations of block 87 implement initialization processes (e.g., where program modules of the robotic manipulator arm are loaded, etc.). Operations of block 88 determine whether a manual override has been activated (e.g., a button is pressed, and/or so on). If manual override has been activated, then flow proceeds to block 89, where the process allows a user to manually reposition the robotic joint (e.g., by releasing motor control of the robotic joint). If manual override has not been activated, then flow continues from block 88 to block 90.

Operations of block 90 read a present angle of the robotic joint from a joint position sensor. This provides an initial reference point for the robotic joint. Operations of decision block 91 determine whether the robotic joint is at the desired angle. In one implementation, the desired angle for the joint is an angle determined according to instructions received from a central control unit (e.g., please see the central control unit 130 of FIG. 9). In one implementation, such a desired robotic manipulator arm joint angle may be maintained indefinitely until another instruction is received from the central control unit, a user manually overrides the angle, etc. If the operations of block 91 determine that the joint is not at the desired angle, then operations of block 92 correct the angle of the joint (e.g., via drive motor correction calculated to reposition the joint at the desired angle). If the joint is at the desired angle, then the flow continues to block 93. Operations of block 93 read motor position and velocity. In one implementation, motor position and velocity inputs are received, for example, via operations of block 94, from a Brushless Direct Current (BLDC) motor, Hall sensors, optical or magnetic sensors, and/or so on. Operations of block 95 determine whether the joint is on the proper trajectory according to a desired trajectory for the joint. If the joint is not on the proper trajectory, operations block 92 applies drive motor correction to reposition the joint to the proper trajectory. If the joint is on the proper trajectory, then the process continues with the operations of decision block 88, as described above.

FIG. 8 shows an exemplary multiple printed circuit assembly 40a-e (corresponding to controller 40 of FIG. 5) which is each contained within the gearbox housing, according to one embodiment. Connectors 83 and 84, shown in FIGS. 1, 3, and 4, provide for a daisy-chained attachment to the serial RS 422 data bus twisted pair 82. Since RS 422 allows for multiple controllers on the same electrical pair, each controller 40 PCA is provided a unique address at power up or pre-programmed at the factory to allow a single external master controller 100 to communicate with it via one of many standard command and data serial protocol. In this implementation, power is provided by a daisy-chained power bus comprising a positive wire 81 and a ground wire 80. Power connectors 85 provide an exemplary means of connecting the controller 40 PCA to the power bus. Likewise, motor connector 86 provides for electronic DC brushless motor control and commutation by well-known means. Encoder hall sensor wires contained in connector 86 provide for reading and decoding the state of the motor hall effect position sensors, so that by means of computation, controller 40 can determine actual motor position, velocity, and acceleration, as well as the actual joint output position by reading the state of rotational positional sensor 70 (please see FIG. 8).

Figure 9:
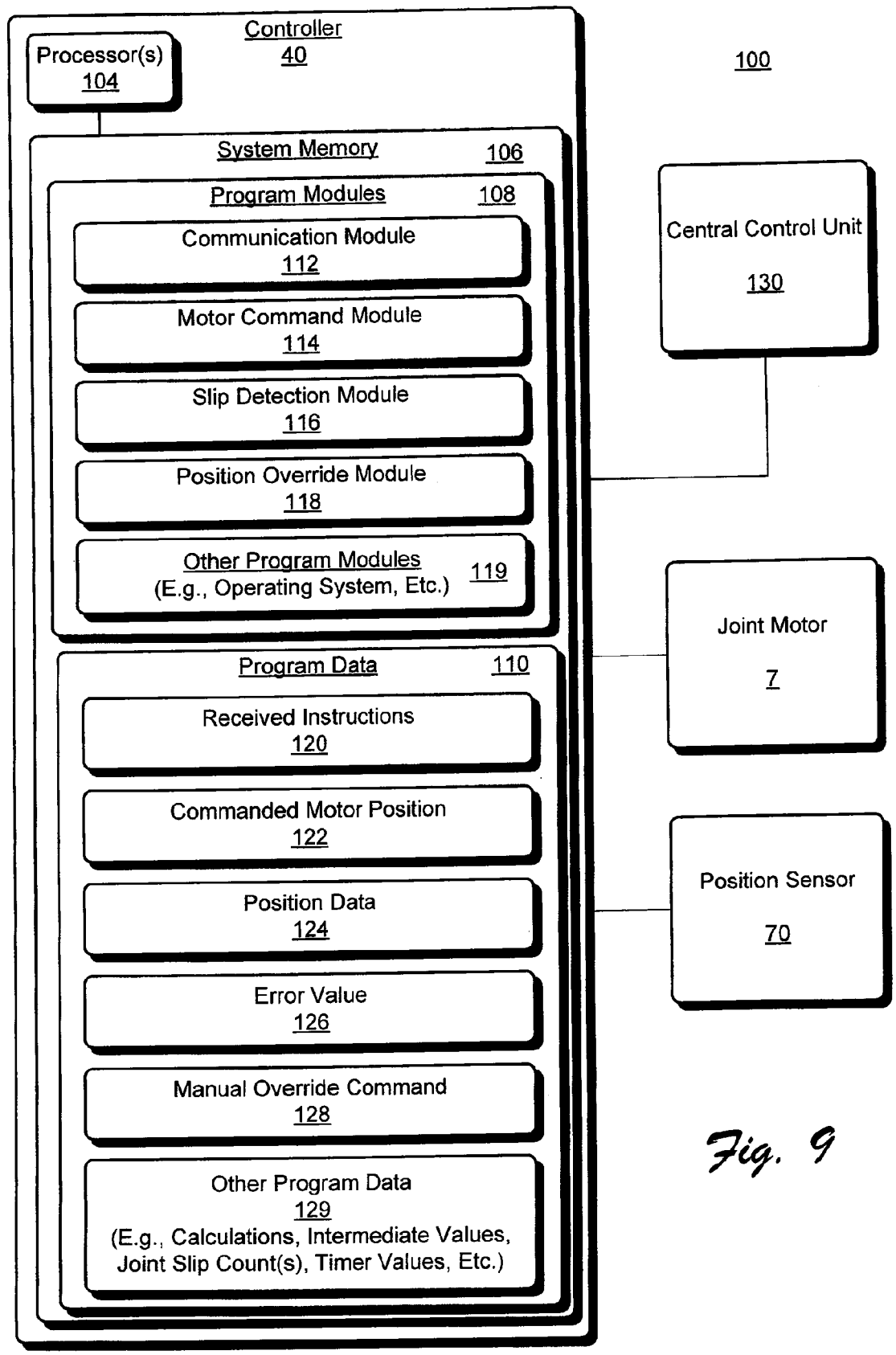
FIG. 9 is a system diagram of a control system for a robotic joint, according to one embodiment.

FIG. 9 shows a block diagram of a control system for a robotic manipulator arm, according to one embodiment. System 100 includes a controller 40 (please see also FIGS. 3, 5, and 8), or a computing device. In this example, the controller includes one or more processors 104 coupled to system memory 106. The system memory includes program modules 108 and program data 110. In this exemplary implementation, the program modules include communications module 112, motor command module 114, slip detection module 116, position override module 118, and "other program modules" 119 such as an operating system, etc. In this example, program data modules 110 include received instructions 120, commanded motor position 122, position data 124, error value 126, manual override command 128, and "other program data" 129 such as calculations, joint slip counts, sensor data, and/or so on. The particular names and quantity of modules 106 implemented for the robotic manipulator arm, as well as their logical architecture, are arbitrary, being a function of the particular implementation. In this example, communications module 112 is configured to send and receive signals from the central control unit 130. There are many different ways that the communication module can be implemented to send and receive such signals, for example, via infra-red communications, wired and/or wireless communications, over a network, and/or so on. In this implementation, the central control unit is operatively coupled to the robotic manipulator arm, for example, via wireless or wired means. Communications module 112 also is configured to receive signals from joint motor 7 and rotational position sensor 70. Depending on the type of signal transmitted by the central control unit 130, a corresponding receiver is utilized by the robotic arm. The communications module 112 receives signals from central control unit 130 and captures the signals as received instructions 120. The communications module 112 receives position data 124 from the position sensor 140 and receives manual override commands 128 from a user interface for the release of the joint position. Commanded motor position 122 is sent by the communications module to the joint motor 7.

Suitable structure and components used for system 100 and the interconnection mechanisms among the central control unit 130, joint motor 7, position sensor 70, and control system 100 will be discernible to those skilled in the art in light of this disclosure. For example, the controller 40 processor(s) 104 and system memory 106 may be implemented as a computing device comprising a microprocessor with associated memory (e.g., random access memory, read-only memory, and/or permanent memory, such as optical drives and/or flash memory), and input/output ports. The program modules 108 included in system memory 106 may be in the form of software. Alternatively, a specific integrated circuit may be designed, in which case the program modules 108 will be in the form of integrated logic. Interconnection mechanisms may include direct wiring, a network, wireless signals, etc.

In this example, motor command module 114 is configured to manipulate received instructions 120 and provide corresponding commanded motor position 122. Commanded motor position 122 represents position commands to realize aspects of at least a subset of received instructions 120. In one implementation, for example, the commanded motor position 122 is determined based on algorithms developed for processing a received commanded motor position 122 base on known characteristics of the robotic appendage, including but not limited to the motor, joint, and position tube. In this example, slip detection module 116 is configured to evaluate position data 124 and determine error value(s) 126. In this exemplary implementation, position data 124 provides an absolute measure of the position of the robotic joint. Based on the last known position of the robotic joint and the commanded motor position 122, it is expected that the robotic joint will be in a particular position, within a configurable margin of error. If this expected position is different within a configurable threshold amount from the particular position, then the slip detection module 116 will calculate error value(s) 126. Slip detection module 116 will communicate any such error value(s) to the motor to achieve the particular position (e.g., a result indicated by the received instructions 120). Such joint slip compensation (error correction) may be in the form of one or more sets of joint positioning commands of varying and/or similar magnitude sent to the motor to achieve the desired joint rotational position.

In one embodiment, responsive to slip detection module 116 identifying multiple slips of the robotic joint over time, the slip detection module may implement a robotic joint repositioning delay (e.g., wait a configurable amount of time before re-positioning the joint). In another embodiment, slip detection module 116 may wait until a configurable count and/or magnitude of joint slips has occurred (e.g., over a particular amount of time) before implementing joint repositioning operations. In one embodiment, slip detection module 116 makes an objective determination in view of repetitive slips, feedback from other components of the robotic manipulator arm 102, and/or so on, whether it is attempting to perform a task that is beyond the architectural/structural capability of the robotic manipulator in terms of force, component characteristics (e.g., strength, remaining power, etc.). Repeatedly attempting a certain action that is likely to cause a slip, despite the built-in slip protection of the robotic joint, may damage or use up the power supply of the robotic joint. Therefore, in some cases, immediate correction of joint slip may not be an optimal action responsive to detected joint slip.

Responsive to receipt of manual override commands 128, position override module 118 causes the control of control system 100 to stop until an indication is received that control system 100 should again actively control the robotic joint is received. During the temporary interruption of control by control system 100, the robotic joint may be manually repositioned by a user. When the control system is again re-engaged, it will correct for joint slips.

Figure 10:
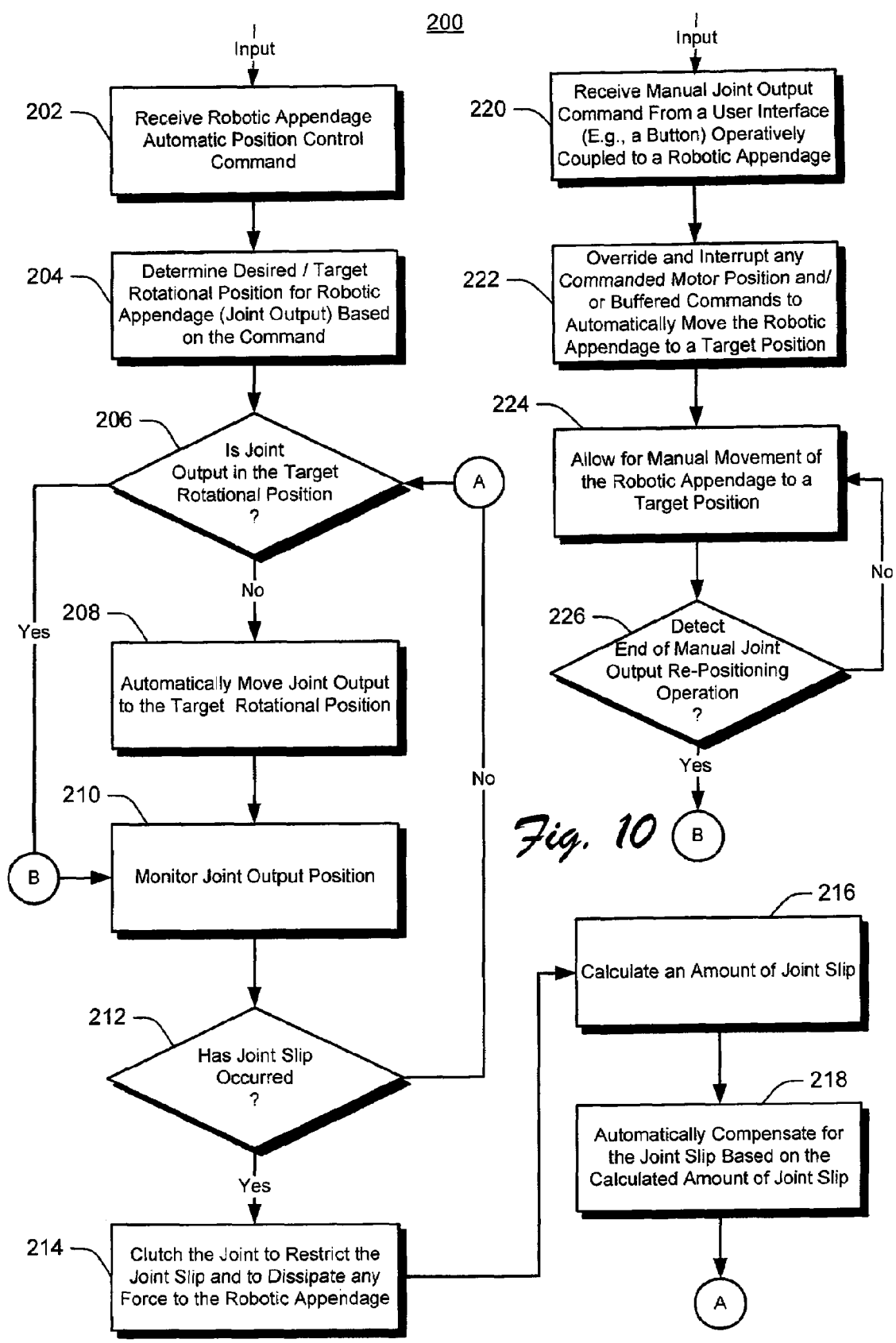
FIG. 10 is a flow chart of a method for controlling a robotic joint, according to one embodiment.

FIG. 10 shows a flow chart for an exemplary method 200 of controlling a robotic appendage, according to one embodiment. Operations of method 200 are implemented, for example, by controller 40 of FIG. 5 or processor(s) 104 of FIG. 9. Computer program instructions executable by the controller and/or processor(s) are represented, for example, by program modules 106 of FIG. 9. Referring to FIG. 10, operations of block 202 receive one or more commands indicating a desired position for robotic appendage joint output. The input to block 202 may come from a central control unit (e.g., central control unit 120 of FIG. 9) operatively coupled (e.g., remote from, or otherwise) to the robotic appendage. Alternatively, the robotic appendage may receive input from a local user interface, such as a button located on the robotic appendage, or the robotic appendage may be pre-programmed with a set of commands.

Operations of block 204 determine desired/target rotational position for the robotic appendage (joint output) based on the received command(s). Operations of decision block 206 determine whether the joint output is in the target rotational position. If so, operations of procedure 200 continue at block 210, as described below. If not, the procedure 200 continues at block 208. Operations of block 208 automatically move the joint output to the target rotational position. Operations of block 210 monitor the joint output position. Operations of decision block 212 determine whether joint slip has occurred. If joint slip has not occurred, operations of procedure 200 continue at block 206, as described above. However, if operations of block 212 determine that joint slip has occurred, the procedure continues at block 214. Operations of block 214 clutch the joint to restrict joint slip and dissipate any force associated with the joint slip. Operations of block 216 calculate the amount of joint slip. Operations of block 218 automatically compensate for the calculated amount of joint slip. At this point, operations of procedure 200 continue at block 206, as shown by on-page reference "A."

As described above, the robotic appendage may include a button or other type of user interface (UI) allowing for a user to release the position of the robotic appendage and manually reposition the joint output. Operations of block 220 receive a manual joint input command from a UI operatively coupled to a robotic appendage. Operations of block 222 override/interrupt any commanded motor position and/or buffered commands to automatically move the robotic appendage to a target position. Operations of block 224 allow for the manual movement of the robotic appendage to a target position. Operations of decision block 226 determine whether the end of the manual joint output re-positioning operation has been detected. In one implementation, such an event is responsive to release of a button by the user. If the end of the manual repositioning operations has not been detected, then the flow returns to block 224 where the joint may be repositioned. If an end of the manual repositioning operations is detected, then the procedure continues at block 210, as shown by on-page reference "B."

CONCLUSION

Although the above sections describe a robotic manipulator arm in language specific to structural features and/or methodological operations or actions, the implementations defined in the appended claims are not necessarily limited to the specific features or actions described. Rather, the specific features and operations for a robotic manipulator arm are disclosed as exemplary forms of implementing the claimed subject matter.

The invention claimed is:

1. A robotic joint comprising:
a rotational position sensor operatively coupled to a main housing member of the robotic joint;
a control system operatively coupled to the rotational position sensor;
the control system, during normal rotational joint motion towards a commanded motor position of joint output, determining that normal joint un-slipped motion is occurring with respect to the joint output responsive to motor input commands;
the control system, responsive to joint slip during commanded motor motion, comparing position data from the rotational position sensor to commanded motor position to generate an error value; and
the control system, based on the error value, compensating for the joint slip.

2. The robotic joint of claim 1, wherein the control system is configured to compensate for the joint slip by determining and applying a set of motor commands to correct the joint slip and drive the joint output until the rotational sensor senses the commanded motor position, the commanded motor position being a predetermined desired rotational position of the joint output.

3. The robotic joint of claim 1, wherein compensating for the joint slip further comprises re-positioning the joint output using one or more non-contacting joint position sensors.

4. The robotic joint of claim 3, wherein the one or more non-contacting joint position sensors comprise magnetic, optical, and linear variable differential transformer joint position sensors.

5. The robotic joint of claim 1, further comprising a clutch mounted in the robotic joint configured to allow for the joint slip based on a pre-determined joint torque that sets a minimum torque that causes the joint slip.

6. The robotic joint of claim 5, wherein the pre-determined joint torque is configurable.

7. The robotic joint of claim 5, further comprising a position tube in communication with the rotational position sensor and the clutch, the position tube being mounted to provide a fixed reference base for the rotational position sensor and connection of a rotational portion of the rotational position sensor to a moving portion of the robotic joint to determine the position data.

8. The robotic joint of claim 5, wherein the robotic joint is a first robotic joint, and wherein wires for connecting a second robotic joint to the first robotic joint extend through the passage and position tube.

9. A robotic joint comprising:
a joint having a first axis of rotation;
a gear set, located in line with the first axis of rotation, the gear set having a first opening through an interior portion of the gear set;
a clutch, in communication with the gear set, the clutch having a second opening through an interior portion of the clutch, the first and second openings lining up to form a continuous passage through the clutch and gear set, the continuous passage allowing for extension through the clutch and gear set without interference to the operation of the clutch and gear set; and
a motor, in communication with the gear set, a motor output of the motor having a second axis of rotation perpendicular to the first axis of rotation.

10. The robotic joint of claim 9, wherein the robotic joint is a first robotic joint, and wherein wires run through the continuous passage for connection to a second robotic joint, the second robotic joint being of a same design as the first robotic joint.

11. The robotic joint of claim 10, wherein the clutch includes a clamping assembly to change a tension on a first clutch portion and a second clutch portion of the clutch, a change in the tension by the clamping assembly resulting in a change in the configurable joint torque corresponding to the tension, wherein the clamping assembly clamps the first clutch portion and the second clutch portion together.

12. The robotic joint of claim 9, wherein a configurable joint torque sets a minimum torque that causes a slip of the clutch.

13. The robotic joint of claim 9, further comprising:
a worm and worm gear set in communication with the motor, the worm transferring power to the worm gear set; and
a belt, communicating with the motor and the worm, wherein the motor communicates with the worm through the belt, wherein the configuration of the worm and belt positions the motor to engage the gear set in a position offset from an end of the gear set such that the motor is in line with the gear set, therefore reducing a profile of the gear set and motor combination.

14. The robotic joint of claim 9, further comprising a position sensor in communication with the joint such that the position sensor measures the position of the joint.

15. The robotic joint of claim 14, wherein a reference portion of the position sensor provides a fixed reference base of a fixed portion of the robotic joint, and wherein a rotational portion of the sensor is operative coupled to a moving portion of the robotic joint to measure rotational position of the moving portion in relation to the fixed portion.

16. The robotic joint of claim 14, wherein the robotic joint further comprises:
a position tub extending through the continuous passage, the rotational portion of the position sensor being mounted on the position tube, the position tube being the moving portion; and
wherein the clutch has a first clutch portion and a second clutch portion, the first clutch portion being non-slippably connected to the joint and the second clutch portion being non-slippably connected to the gear set, the position tube connected to the first clutch portion, such that rotation of the first clutch portion is translated to the position tube.

17. The robotic joint of claim 16, wherein the second clutch portion has a conical surface that corresponds to a corresponding and mated conical surface in the first clutch portion.

18. The robotic joint of claim 14, further comprising:
a processor operatively coupled to the position sensor and the motor, the processor comprising computer program instructions, the computer-program instructions, when executed by the processor, for performing operations comprising:
sending first commands to the motor indicating movement for the motor to position a moveable portion of the robotic joint in a desired position;
receiving a signal from the position sensor indicating an actual position of the moveable portion;
determining whether a slippage between the moveable portion and a fixed portion of the robotic joint has occurred based on the signal and the first commands; and
responsive to determining that the slippage is not null, sending second commands to the first motor to compensate for the slippage.

19. The robotic joint of claim 18, wherein the computer-program instructions further comprise instructions for:
receiving motion control commands from a central control unit remote from the robotic joint; and
executing operations based on the motion control commands to position the moveable portion to a predetermined position.

20. The robotic joint of claim 19, wherein the computer-program instructions further comprise instructions for positioning the moveable portion to the pre-determined position independent of any further communication from the central control unit and the slippage.

21. The robotic joint of claim 19, further comprising a user interface (UI) for selective activation by a user, the UI being operatively coupled to the robotic joint, the UI allowing the user to manually move the moveable portion of the robotic joint independent of the motion control commands.

22. The robotic joint of claim 9, further comprising a structural member providing a manipulating arm attached to the joint, wherein the structural member is hollow and the motor is located in the structural member adjacent to the joint.

23. The robotic joint of claim 22, wherein the robotic joint is a first robotic joint and the motor is a first motor, and wherein the structural member comprises couplings to connect the first robotic joint to a second robotic joint of a same design as the first robotic joint, an interior portion of the structural member being configured to additionally encapsulate the second motor in coupling the first robotic joint to the second robotic joint.

* * * * *